United States Patent
Stoodley

(12) 
(10) Patent No.: US 6,408,305 B1
(45) Date of Patent: Jun. 18, 2002

(54) ACCESS FRONTIER FOR DEMAND LOADING PAGES IN OBJECT-ORIENTED DATABASES

(75) Inventor: Kevin Alexander Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,341

(22) Filed: Aug. 13, 1999

(51) Int. Cl.[7] .............................................. G06F 17/30
(52) U.S. Cl. .................... 707/103 R; 707/205; 711/202
(58) Field of Search ................................. 707/103, 206, 707/205; 709/100; 711/202

(56) References Cited

U.S. PATENT DOCUMENTS

| | | | | |
|---|---|---|---|---|
| 5,526,519 A | * | 6/1996 | Maruyama et al. | 707/103 R |
| 5,590,326 A | * | 12/1996 | Manabe | 711/150 |
| 5,590,327 A | * | 12/1996 | Bilisis et al. | 709/100 |
| 5,649,139 A | * | 7/1997 | Weinreb et al. | 711/202 |
| 5,794,256 A | * | 8/1998 | Bennett et al. | 707/206 |
| 6,105,041 A | * | 8/2000 | Bennett et al. | 707/206 |
| 6,178,519 B1 | * | 1/2001 | Tucker | 707/10 |
| 6,345,276 B1 | * | 2/2002 | Lee | 707/100 |

OTHER PUBLICATIONS

McAuliffe et al, A Trace–Based Silumation of Pointer Swizzling Techniques, Dept. of Computer Sciences, University of Wisconsin, 1995 IEEE, pp. 52–61.*

Moss Eliot B., Working with Persistent Objects: To Swizzle or Not to Swizzle, 1992 IEE, pp. 657–673.*

Wilson et al, Pointer Swizzling et Page Fault Time: Efficiently and Comparibly Supporting Huge Address Spaces on Standard Hareware, 1992 IEEE, pp. 364–377.*

Kemper et al, Adaptable Pointer Swizzling Strategies in Object Base, IEEE, 1993, pp. 155–162.*

* cited by examiner

Primary Examiner—John Breene
Assistant Examiner—Debbie M Le
(74) Attorney, Agent, or Firm—Casey P. August

(57) ABSTRACT

A method, system and article of manufacture for providing access frontier page(s) around all accessible memory pages loaded from an object-oriented database to prevent simultaneous access by multiple threads to an initializing page. On initializing the root pages from an object-oriented database including bringing them into memory and swizzling pointers in the pages, access frontier pages corresponding to each swizzled pointer are initialized and marked as inaccessible. All pointers contained in these access frontier pages that do not point to either an initialized and accessible page such as a root page or another access frontier page have page table entries created for them and are marked inaccessible. Any dereference of a pointer that causes a fault must be an access to an object on an access frontier page. A page fault interrupt handling routine proceeds, for each of the uninitialized pages pointed to by pointers on the faulted access frontier page, to convert it into an access frontier page by initializing a corresponding page from the object-oriented database, including bringing in the page and swizzling pointers in the page, and setting up inaccessible page table entries for pointers that do not point to other frontier pages or accessible and initialized pages, and marking the page inaccessible. The faulted page is marked accessible thereafter and surrounded by access frontier pages.

8 Claims, 7 Drawing Sheets

ACCESS FRONTIER FOR DEMAND LOADING PAGES IN OBJECT-ORIENTED DATABASES

FIELD OF THE INVENTION

This invention relates to loading of pages from object-oriented databases. More particularly, this invention relates to providing access frontier page(s) around all accessible memory pages loaded from an object-oriented database.

BACKGROUND OF THE INVENTION

Some computer programs typically create, delete, modify and access a large number of data objects ("objects") using one or more computer systems, which systems may be stand-alone or connected into a network. Such programs often use persistent object systems to maintain these objects and make them available for creation, deletion, modification and access on all or any of the computer systems. Persistent object systems, such as object-oriented databases, ensure the continuing availability of persistent objects by storing them in a non-volatile manner in an object server, such as a database or a file system, while allowing persistent objects to be moved into a computer system's main memory to be accessed and manipulated by programs executing on the computer system.

When a program uses the persistent object system to access or modify an object stored on an object server, the persistent object system transfers the object from the object server to the main memory of the computer system ("the loaded object") on which the program is executing. A conventional technique for loading such an object is to use the page protection systems of an existing virtual memory management system found in most operating systems to bring in the page containing the object into main memory.

Moreover, it is common for an object to contain references to other objects which references are typically represented in persistent object systems by persistent pointers in the object. The conventional persistent object system usually facilitates management of these pointers and referred objects. To this end, the page containing the loaded object is initialized typically by bringing that page into memory and replacing the persistent pointers in the page, which pointers cannot generally be used by the program to access and modify the referenced objects referred to by the persistent pointers, with main memory pointers that the program can use to access and modify the referenced objects in the virtual address space of the program's process. Replacing a persistent pointer with a main memory pointer in this manner is called "swizzling" the persistent pointer.

Thus, each persistent pointer in the page containing the loaded object is replaced with a main memory pointer and a page, marked as inaccessible (paged out), corresponding to each swizzled pointer is allocated by the page protection system. Virtual memory managers divide a main memory address space that is larger than actual main memory into pages of a fixed length. Thus, some of the pages in the main memory space are actually represented in the main memory, while others usually are "paged out." When a program attempts to dereference a main memory pointer to such an inaccessible page (or in other words attempt to access a referenced object on an inaccessible page), a page fault is generated and caught by a page fault interrupt handling routine of the persistent object system (e.g. a object-oriented database runtime). The page fault interrupt handling routine marks the faulted page as accessible (read/write) and loads (pages in) the faulted (inaccessible) page containing the referenced object from the object server into main memory using its persistent pointer. After loading, the page is further initialized as described earlier by swizzling of all pointers contained in the page and allocating any new pages, marked as inaccessible, corresponding to the swizzled pointers. After initialization is complete, the dereferencing operation is allowed to proceed. Subsequent attempts to dereference that main memory pointer proceed without further delay. Accordingly, persistent objects are advantageously loaded (instantiated in memory) as they are accessed by the program (i.e. on demand), rather than all at once at start-up time (i.e. eager swizzling).

A disadvantage and problem with this scheme results from the page fault interrupt handling routine running in the same process as the program. Once the routine has set a page to be accessible so that it can initialise the page (including swizzling pointers and allocating inaccessible pages), any other thread in that process can also access that page without causing a fault to be generated. If a thread does so before initialization is complete, the thread may get data in an incorrect state from that page because another thread has made changes to the data on the page. Similarly, any changes (writes) the thread makes may be overwritten by the page fault interrupt handling routine's initialisation activities resulting in an incorrect state for later accessing threads.

A possible solution to this problem on some systems is to stop all threads while a fault is handled. Obviously, such a solution could severely degrade performance of a program as it waits for the fault to be handled. On multiprocessor systems, significant system resources might be left idle while a fault is being handled according to this solution.

Another possible solution to this problem on some systems is to provide multi-process capabilities to the program and other applications, transferring the pages from the database into shared memory and having the page fault interrupt handling routine communicate through some inter-process communication (IPC) mechanism with a second process (with its own set of page access rights) that does all the swizzling and initializing before making the pages accessible in the program's address space. This solution however suffers from IPC "overhead" as well some systems limit the amount of shared address space that can be allocated thus possibly limiting the maximum size of program supported.

Another possible solution to this problem on some systems is to lessen the window of erroneous accessibility by raising the priority of the page fault interrupt handling routine as high as possible so that other threads have little chance of doing any work while the page fault interrupt handling routine is active. Clearly, this does not completely solve the problem; there is still a possibility of an incorrect state. Also, since the page fault interrupt handling routine will likely perform disk input/output (I/O) operations, it is inevitable that the routine will lose control of the central processing unit (CPU) regardless of its priority. Indeed, on multiprocessor systems, this solution would likely provide no additional protection from an incorrect state.

Accordingly, new and improved systems, methods, articles of manufacture tangibly embodying a program of instructions for loading pages from object-oriented databases is needed to overcome these and other disadvantages.

SUMMARY OF THE INVENTION

This invention provides new and improved systems, methods and articles of manufacture tangibly embodying a program of instructions for loading of pages from object-oriented databases.

A method, system and article of manufacture for providing access frontier page(s) around all accessible memory pages loaded from an object-oriented database to prevent simultaneous access by multiple threads to an initializing page. On initializing the root pages from an object-oriented database including bringing them into memory and swizzling the pointers in those pages, access frontier pages corresponding to each swizzled pointer are initialized and marked as inaccessible. All pointers contained in these access frontier pages that do not point to either an initialized and accessible page such as a root page or another access frontier page have page table entries created for them and are marked inaccessible. Any dereference of a pointer that causes a fault must be an access to an object on an access frontier page. A page fault interrupt handling routine proceeds, for each of the uninitialized pages pointed to by pointers on the faulted access frontier page, to convert it into an access frontier page by initializing a corresponding page from the object-oriented database, including bringing in the page and swizzling pointers in the page, setting up inaccessible page table entries for pointers that do not point to other frontier pages or accessible and initialized pages, and marking the page inaccessible. The faulted page is marked accessible thereafter and surrounded by access frontier pages.

In accordance with the invention, there is provided a method for loading pages from a persistent object system comprising the steps of, for each pointer in a page; initializing a corresponding page; for each corresponding page pointer not pointing to an initialized page, creating a page table entry for the corresponding page pointer and marking the page pointed to by the corresponding page pointer as inaccessible; and marking the corresponding page as inaccessible. The above method may also be provided wherein the step of initializing comprises bringing in the corresponding page from the persistent object system and if the corresponding page contains one or more pointers, swizzling one or more pointers in the corresponding page. Also, the page may be a root page of a program brought in from the persistent object system before execution of the program. And, the step of creating a page table entry may further comprise initializing the page pointed to by the corresponding page pointer. Also, the above method may further comprise the steps of, on dereferencing a pointer in the page that causes a fault; for each pointer not pointing to an initialized page in the page pointed to by the dereferencing pointer; initializing a corresponding page; for each corresponding page pointer not pointing to an initialized page; creating a page table entry for the corresponding page pointer and marking the page pointed by the corresponding page pointer as inaccessible; and marking the page pointed to by the dereferencing pointer as accessible. And it may further comprise the step of managing two or more dereferencing operations arising concurrently on two or more threads through a lock and synchronization mechanism.

There is also provided a method for protecting an accessible and initialized page having one or more pointers comprising the step of providing an access frontier page corresponding to each pointer in the initialized and accessible page. This method may further comprise the steps of, on dereferencing a pointer in the accessible and initialized page, providing an access frontier page corresponding to each pointer in a page corresponding to the dereferenced pointer; and marking the page corresponding to the dereferenced pointer as accessible. Additionally there may be provided the step of, if an access frontier page has one or more pointers not pointing to an access frontier page or an initialized and accessible page, creating a page table entry for each such access frontier page pointer and marking the page pointed by each such access frontier page as inaccessible.

Additionally, there is provided a method for dereferencing a pointer to an initialized and inaccessible page having one or more pointers, comprising the steps of, on dereferencing a pointer in the initialized and inaccessible page that causes a fault; for each pointer pointing to an uninitialized page in the page pointed to by the dereferenced pointer; initializing a corresponding page; for each corresponding page pointer not pointing to an initialized page; creating an uninitialized page and marking the uninitialized page inaccessible; and marking the page pointed to by the dereferencing pointer accessible.

There is also provided an article of manufacture comprising a computer usable medium having computer readable program code means therein for loading pages from a persistent object system, the computer readable program code means in said computer program product comprising computer readable code means for causing a computer to perform the above methods.

And, there is provided a computer system for loading pages from a persistent object system comprising means for initializing a corresponding page for each pointer in a page; means for creating a page table entry for the corresponding page pointer and marking the page pointed to by the corresponding page pointer as inaccessible for each corresponding page pointer not pointing to an initialized page; and means for marking the corresponding page as inaccessible.

DETAILED DESCRIPTION OF THE INVENTION

Figure 1:
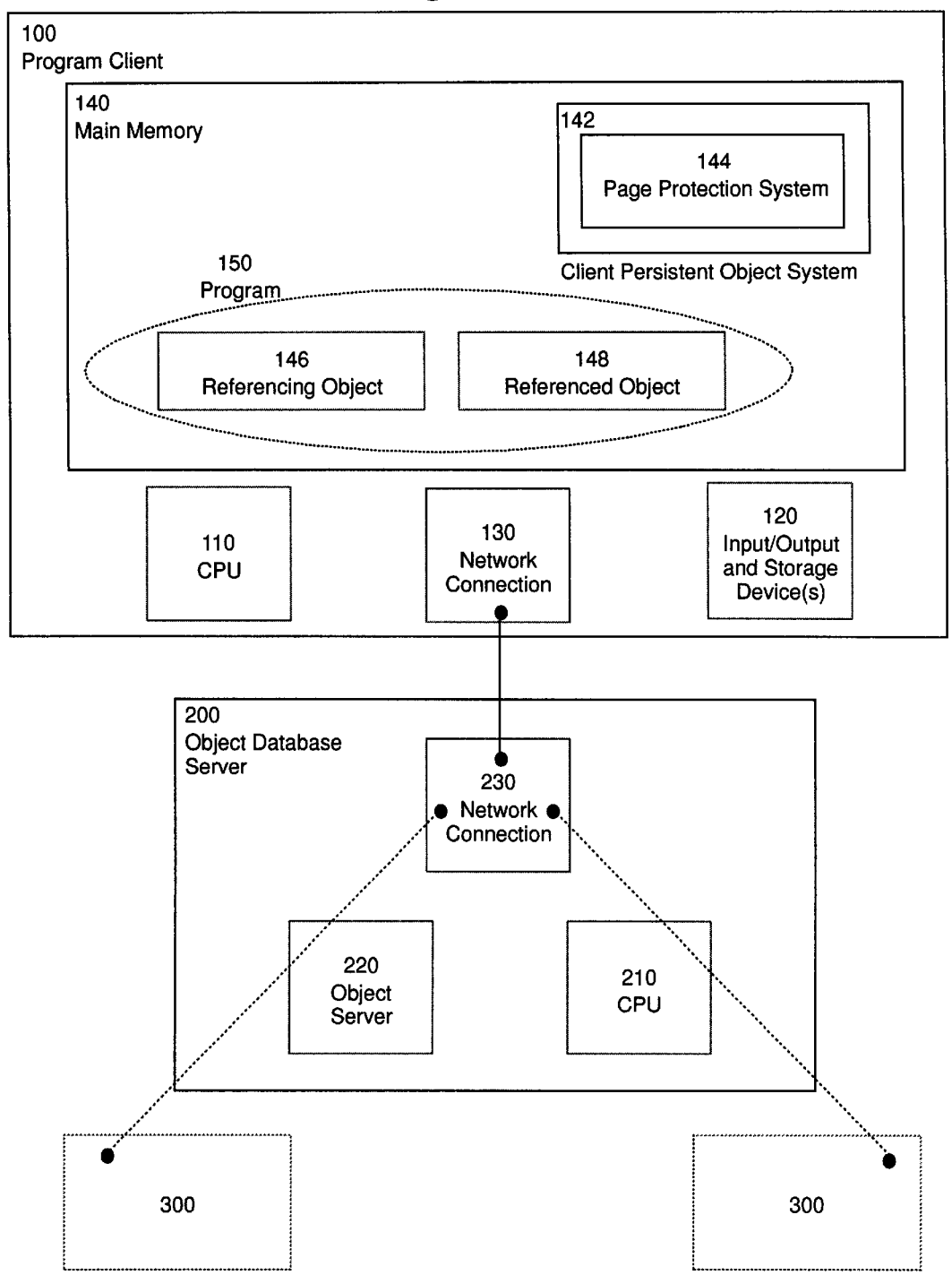
FIG. 1 is a high-level block diagram of a persistent object system in which the preferred embodiment of the present invention operates.

FIG. 1 is a high-level block diagram of a persistent object system (e.g. object-oriented database) in which the preferred embodiment of the invention operates. The persistent object system comprises a program client 100 (and, optionally, program clients 300) and an object database server 200—each client and server in the preferred embodiment being embodied in separate computer systems but may optionally be integrated into one computer system. The program client 100 contains a central processing unit (CPU) 110, input/output and storage devices 120, a network connection 130 and a main memory 140. In the preferred embodiment, program client 100 and object database server 200 are conventional general purpose computers such as personal computers or mainframes although it should be apparent to those skilled in the art that other general purpose or specially constructed devices could be used. The input/output and storage devices 120 can include a storage device, such as a hard disk drive, for persisting program information; a removable media storage device, such as a CD-ROM drive, for persisting program information and/or installing programs which are provided on a computer-readable medium such as a CD-ROM; and/or such input/output devices such as a computer monitor, keyboard, a mouse and the like. The network connection 130 enables the program client to exchange data with other systems such as the object database server 200. The main memory 140 contains a client persistent object system 142 that operates in conjunction with the object database server 200 for creating and maintaining a set of objects of an application program 150 persistently. The client persistent object system contains a page protection system 144 used by the client persistent object system to bring the object(s) of a program 150 into main memory 140. In the preferred embodiment, the page protection system 144 brings a page into the program client 100 from the object database server 200 containing the object. The program 150 includes a referencing object 146 and a referenced object 148 as well as other referenced objects (not shown); all such objects being initialized in main memory by the client persistent object system 142. While a program may contain only one object, a typical program comprises two or more objects in which at least two are interrelated by an object reference such as referencing object 146 and referenced object 148. CPU 110 is used by and makes use of the input/output and storage devices 120, the network connection 130, the main memory 140, the client persistent object system 142, the page protection system 144, the program 150 and other resources and programs of the program client 100 (not shown).

FIG. 1 also shows an object database server 200 that includes a central processing unit (CPU) 210, an object server 220, and a network connection 230. Object database server 200 is shown connected via network connection 230 of the object database server to program client 100 via its network connection 130. Optionally, object database server 200 may be connected to other program clients 300. Object server 220 maintains a set of persistent objects corresponding to the objects of the program 150 by storing them in a non-volatile manner in, for example, one or more hard disk drives (not shown). In the preferred embodiment, the object server is an object-oriented database that stores persistent objects to the object database server hard disk(s). The object server 220 responds to requests from other parts of the persistent object system, such as client persistent object system 142, to transfer persistent objects in and out of the object server to the requesting program client, such as program client 100. CPU 210 is used by and makes use of the object server 220, network connection 230 and other resources and programs of the object database server 200 (not shown).

While the present invention is preferably implemented on one or more computer systems configured as described above, those skilled in the art will recognize that it may also be implemented on one or more computer systems having different configurations. The computer systems may not contain all of the features shown in FIG. 1, or may contain features not shown in FIG. 1. For example, it should be apparent to those skilled in the art that not all of the input/output and storage devices described above are required, that the above list of input/output and storage devices is not exhaustive and other types of such devices can be equally used with or substituted for the above listed devices, and that different combinations of these or unlisted devices may be used in accordance with this invention. As another example, certain features of the object database server 200, such as the object server 220, may be found instead in the program client 100.

Figure 2:
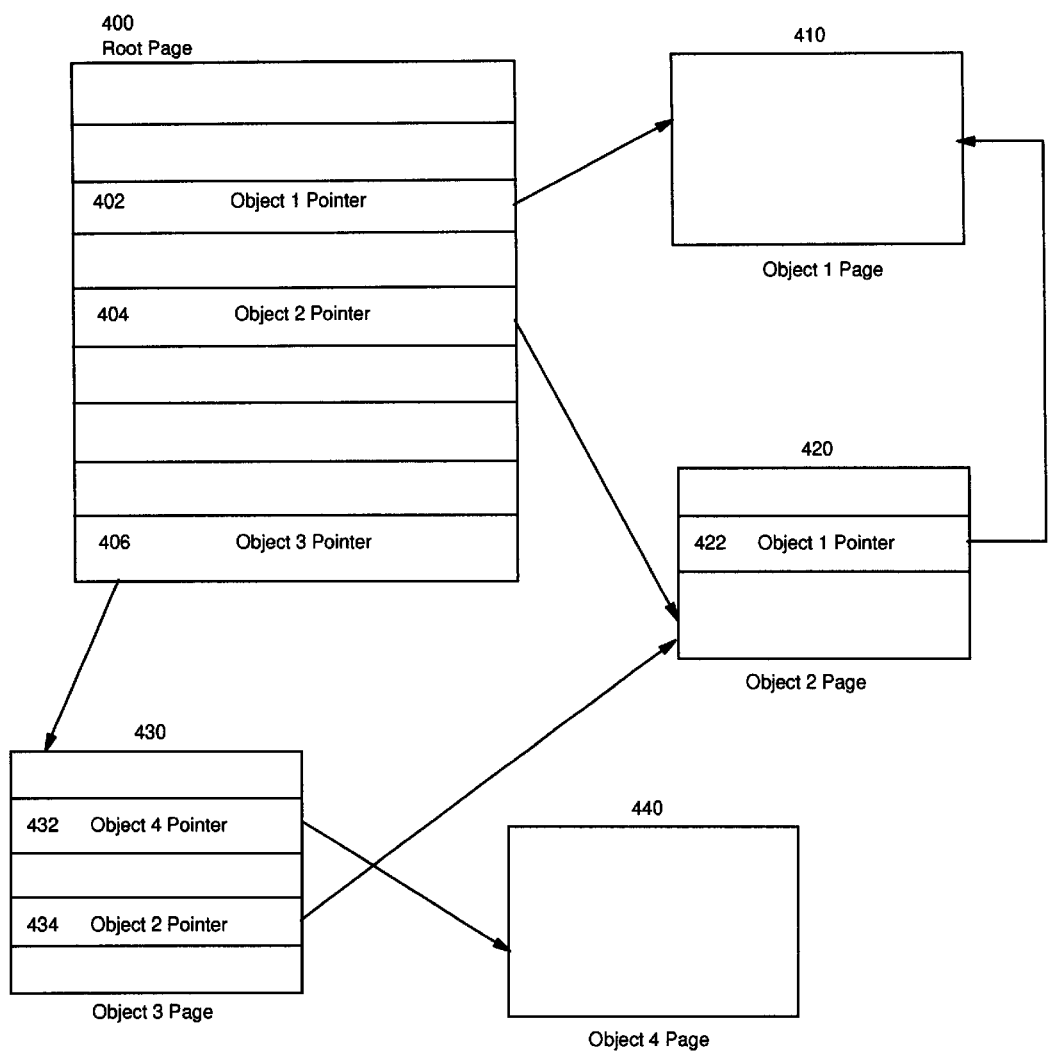
FIG. 2 is a diagram depicting the root page loading and initialization of the present invention.
Figure 4A:
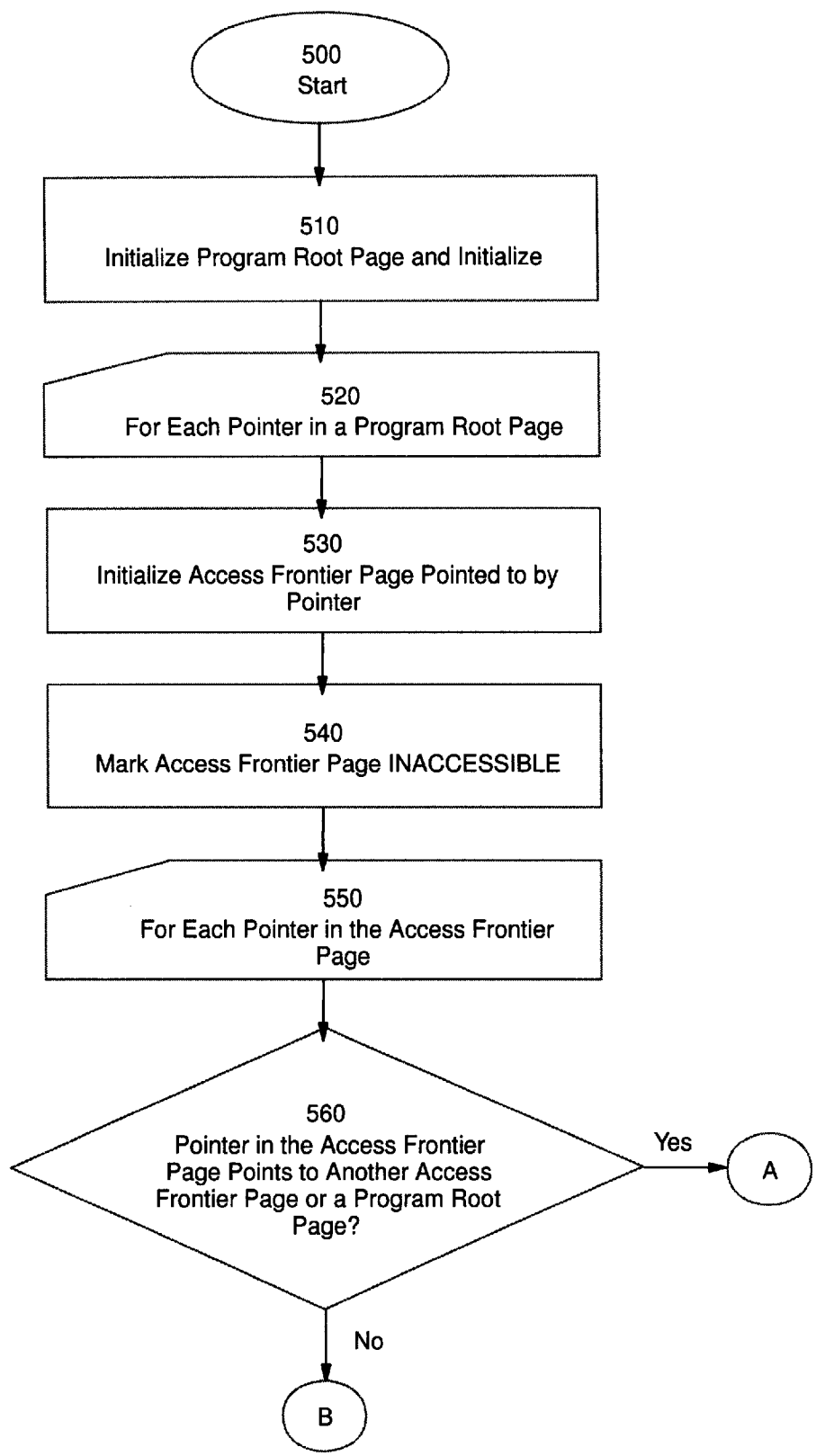
FIGS. 4A to 4D is a flow chart describing the steps of page loading and initialization in accordance with the present invention.
Figure 4B:
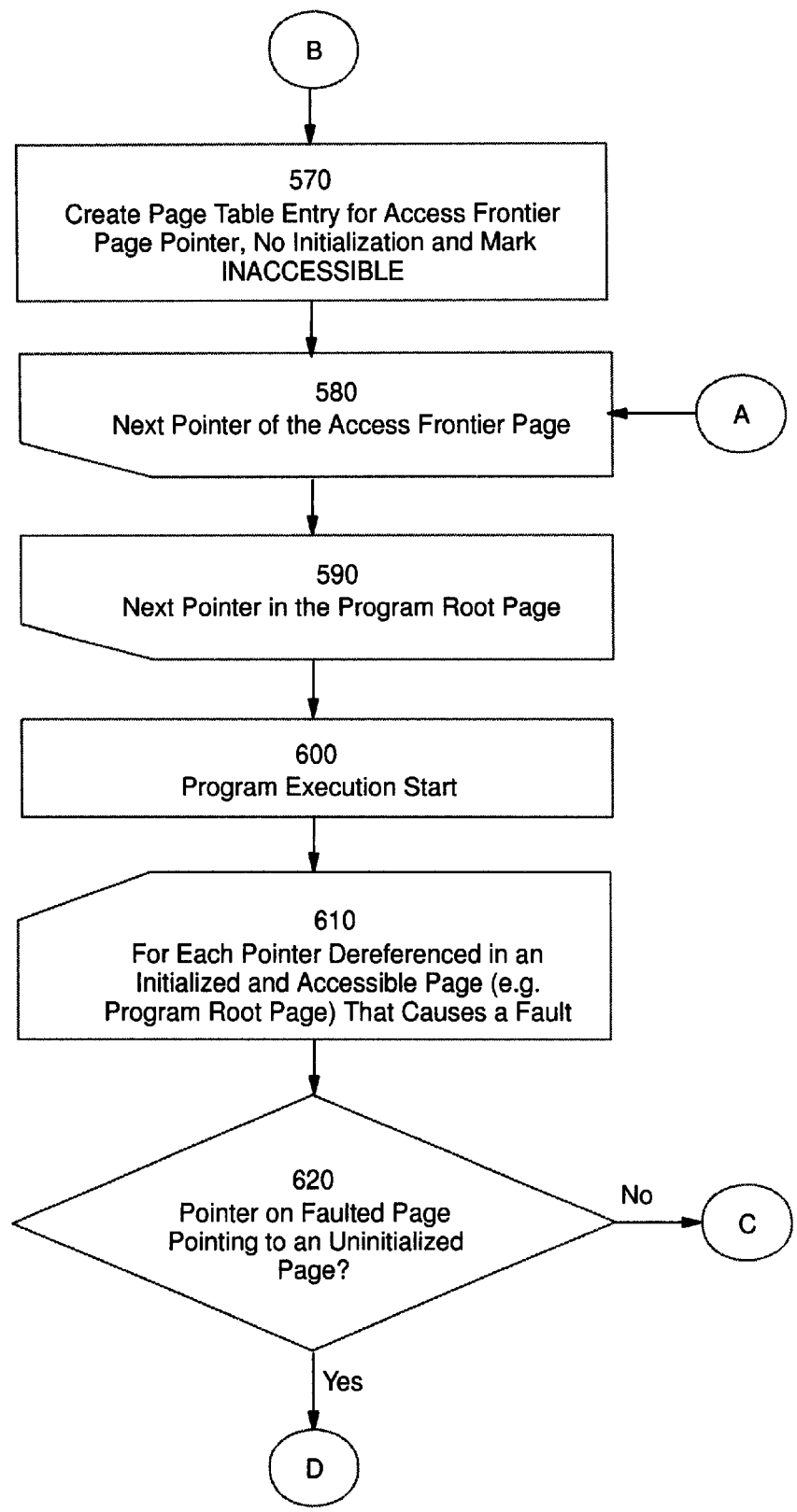
Figure 4C:
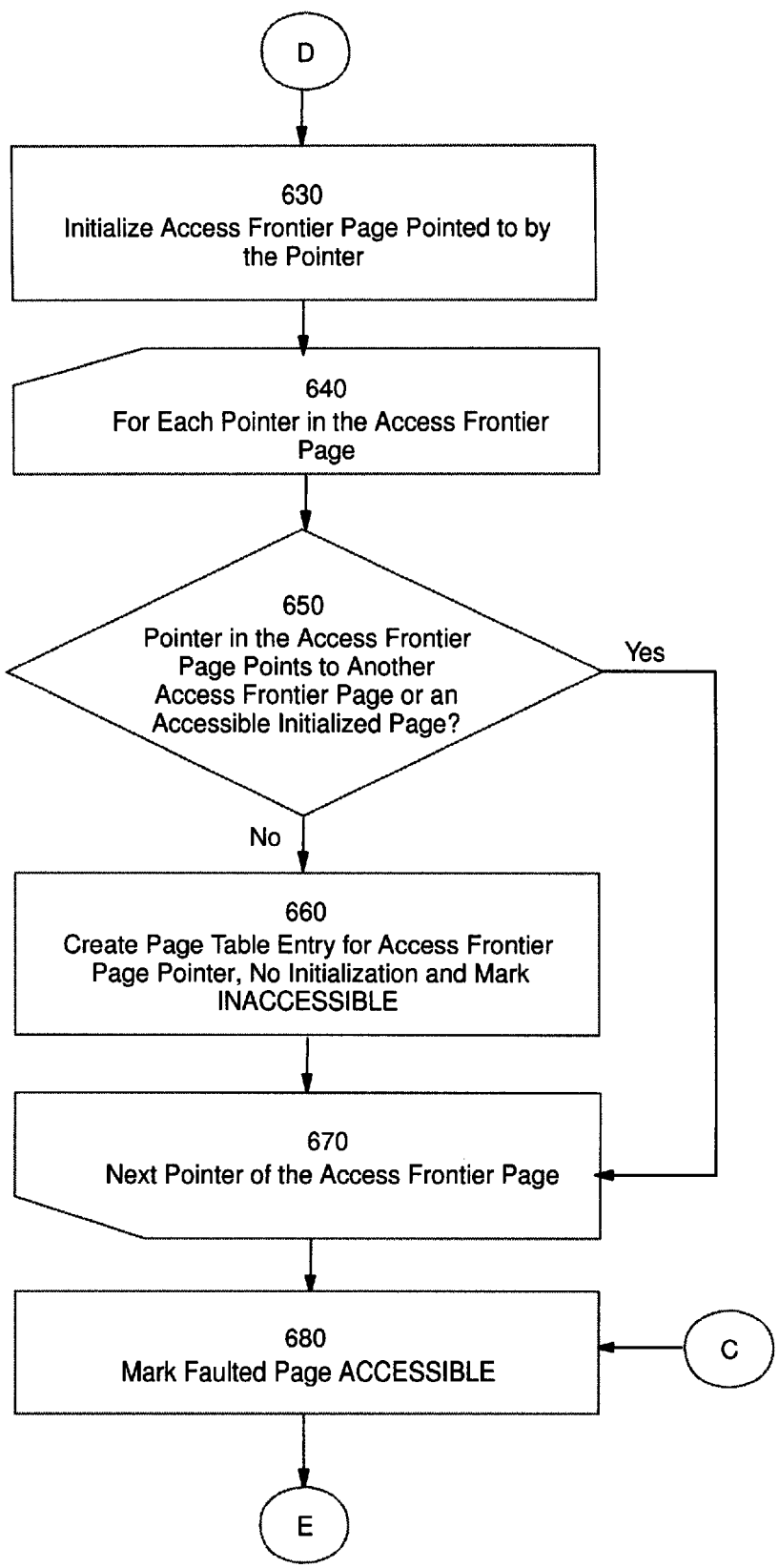
Figure 4D:
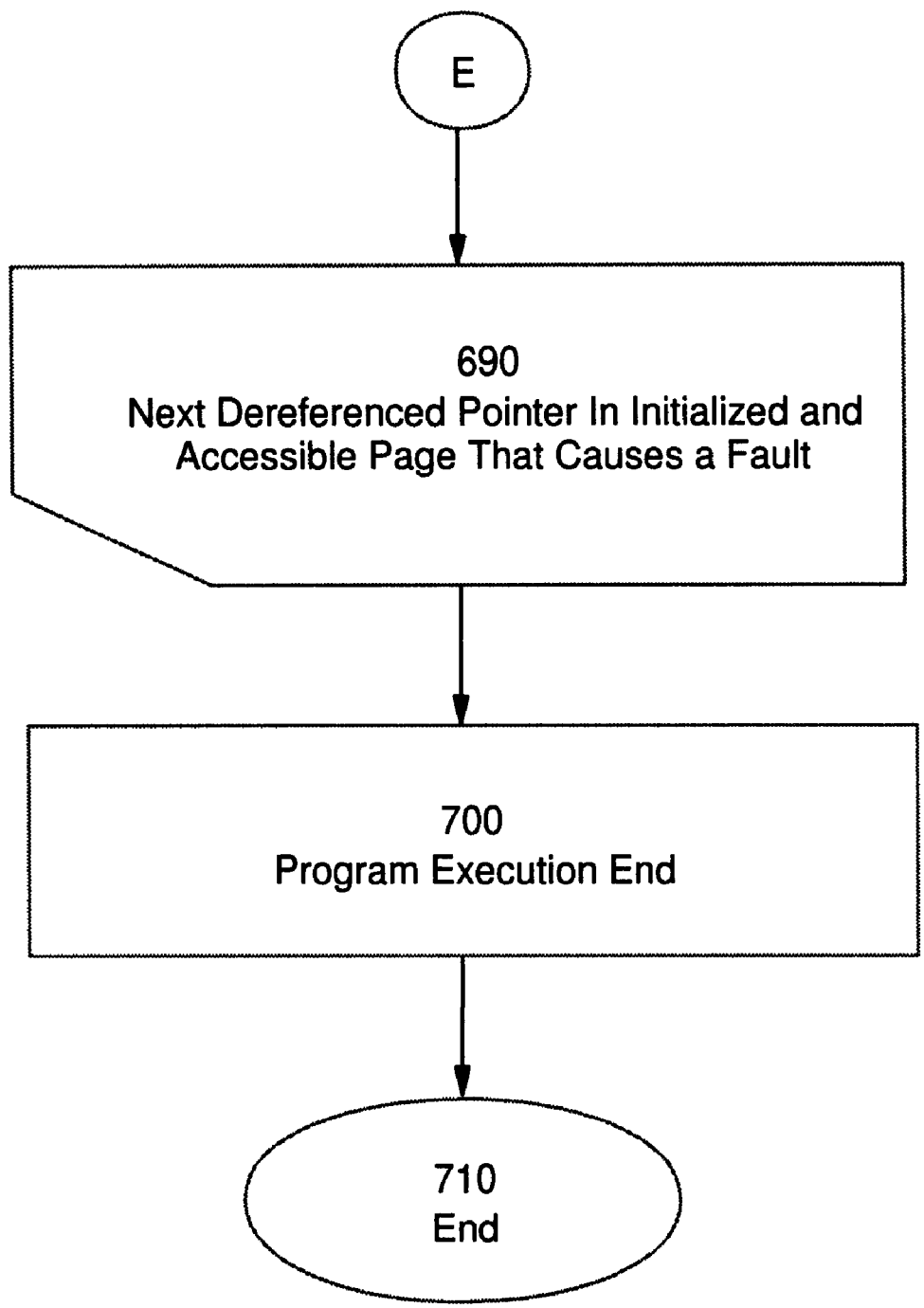

Referring to FIG. 2 in conjunction with FIG. 1, the preferred embodiment of the present invention for loading pages from object-oriented databases is described. Additionally, referring to FIGS. 4A to 4B, the method steps of the present invention as described hereafter will be generally corresponded to FIGS. 4A to 4B's flowchart element(s) by placing the relevant figure element number in square brackets e.g. "The program is allowed to proceed execution [600]".

According to the present invention, before the program 150 is permitted to begin execution on the CPU 110 [500], the database root page(s) for the program's objects is brought in from the object server 220 and initialized by the page protection system 144 [510]. The database root page(s) is the page(s) in the object database containing the root object(s) of the program, which object(s) in FIG. 1 corresponds to the referencing object 146. A root page or any other page brought in from the object database may contain one or more program objects including at least a root object in the case of a root page or a referenced object in the case of other pages brought in from the object database. Furthermore, the pages may include one or more object references (pointers) to one or more referenced object(s). In FIG. 1, referencing object 146 contains an object reference (pointer) to referenced object 148 (not shown).

Initializing a root page (or any other page from the object database) typically involves finding a free page frame in main memory (taken from a free page frame list maintained by the page protection system 144 or "paging" out an occupied page to storage to make a free page frame available in main memory 140), transferring (bringing in) the page from the object server 220 into the page frame in main memory 140 via the persistent object system, modifying a page table (not shown) in the page protection system 144 to reflect that the page is now in memory and "swizzling" the object references (pointers) in that page. The preceding was not an exclusive or exhaustive list of initialization steps and in some systems all the aforementioned initialization steps may not be required or may be done in differing order. As described above, "swizzling" by the client persistent object system 142 involves replacing the persistent pointers in the page, which pointers cannot generally be used by the program to access and modify the referenced objects referred to by the persistent pointers, with main memory pointers that the program can use to access and modify the referenced objects in the virtual address space of the program's process.

Further as part of the swizzling operation of the present invention, the page corresponding to each swizzled pointer in a root page [520, 590] is initialized by the page protection system 144 [530] and marked as inaccessible (paged out) [540]. All such pages (i.e. pages initialized but marked as inaccessible) form the "access frontier" for the root page. That is, a collection of inaccessible pages that "surround" a root page. All pointers contained in these access frontier pages [550, 580] that do not point to either a root page or an access frontier page [560] have pages created for them during initialization [570]. These pages are made inaccessible and are not initialized [570]. In fact, only page table entries would exist for these pages so that their virtual addresses would be known but no backing real memory would be created for these pages. So when the process of initializing the access frontier pages is complete, the access frontier pages are fully initialized, including complete swizzling of all pointers contained in them. A deference operation that makes access to an object contained in one of the access frontier pages, requires simply marking that page as accessible subject to the completion of access frontier page processing of the present invention.

Referring to FIG. 2, there is depicted an example of a program's root page and associated pages initialized in main memory 140 according to the present invention. Root page 400, containing a root object of the program 150 (not shown), includes a number of object references (pointers). In particular, the root page contains an object 1 pointer 402 to object 1, an object 2 pointer 404 to object 2, and an object 3 pointer 406 to object 3. As the root page is initialized, the object pointers are swizzled and pages corresponding to the object pointers are initialized. Accordingly, object 1 page 410 containing object 1 pointed to by object 1 pointer 402 is brought in from the object server 220 and initialized. Similarly, object 2 page 420 containing object 2 pointed to by object 2 pointer 404 and object 3 page 430 containing object 3 pointed to by object 3 pointer 406 are brought in from object server 220 and initialized. In each case, the page is made inaccessible (unlike the root page which is accessible). These pages make up the access frontier pages for the root page.

Furthermore, according to the present invention, the pointers in such access frontier pages are swizzled and for any pointers not pointing to either a root page or another access frontier page, a page, marked as inaccessible, is created but not initialized. Thus, neither object 1 pointer 422 in object 2 page 420 nor object 2 pointer 434 in object 3 page 430 required the creation of a page since they pointed to preexisting access frontier pages. However, object 4 pointer 432 in object 3 page 430 required the creation of an inaccessible, but not initialized, page—object 4 page 440.

Once the root page is initialized and the associated pages are initialized and/or created, the program is allowed to proceed with execution [600]. When the program dereferences a pointer in the root page and causes a fault [610, 690], then that must be an access to an access frontier page since all access frontier pages are marked as inaccessible (which marking causes fault). Deferencing pointers without a fault in the present invention means an access to an initialized and accessible page. Upon occurrence of the fault, the page fault interrupt handling routine of the present invention proceeds, for each of the uninitialized pages pointed to by pointers on the faulted page [620], to find a free page frame in main memory (taken from a free page frame list maintained by the page protection system 144 or "paging" out an occupied page to storage to make a free page frame available in main memory 140) for the page table entry previously allocated to that uninitialized page (note that all pointers in access frontier pages not pointing to a root page or other access frontier pages were swizzled but no backing memory was allocated to the pages corresponding to those pointers viz. object 4 page 440), transfer the corresponding page from the object server 220 into the page frame allocated in main memory 140 via the persistent object system, modify a page table in the page protection system 144 to reflect that the page is now in memory and swizzle the pointers in the page, all resulting in an access frontier page [630]. Each of the uninitialized pages was originally marked inaccessible when it was created and remains inaccessible after initialization into an access frontier page. These pages in addition to the other pages previously initialized but marked inaccessible and pointed to by pointers on the faulted page (i.e. access frontier pages for another accessible page such as a root page) become the access frontier pages for the faulted page. That is, the soon to be accessible faulted page is "surrounded" by inaccessible pages except for a properly initialized and accessible root page(s). Furthermore, each pointer contained in these new access frontier pages [640, 670] that does not point to either the faulted page, a root page (an initialized and accessible page) or an access frontier page [650] has a page created for it [660]. As described above in respect of a root page, each of these pages are made inaccessible but are not initialized [660]. Only page table entries would exist for these pages and no backing memory is created for them [660]. Finally, the faulted page is made accessible [680]. At this point, the faulted page has been converted from an initialized but inaccessible access frontier page to an initialized and accessible page.

In a similar manner, any dereferencing of a pointer in any initialized and accessible page resulting in a fault is handled according to the above procedures of the present invention. The result is that each faulted page has an access frontier of inaccessible pages partially surrounding it with initialized, accessible pages occupying the remaining portion. For all pointers in the access frontier pages that do not point to any of the other access frontier pages or the initialized and accessible pages, a page marked as inaccessible is created but not brought in from the object server nor initialized in any other way. No backing memory is allocated for these uninitialized, inaccessible pages.

Optionally, all the pages in the present invention that are created but not brought in from the object server nor otherwise initialized may instead be initialized including bringing in the relevant page into memory. This may slow performance and require extra memory space but would not impact the proper functioning of the invention.

Figure 3:
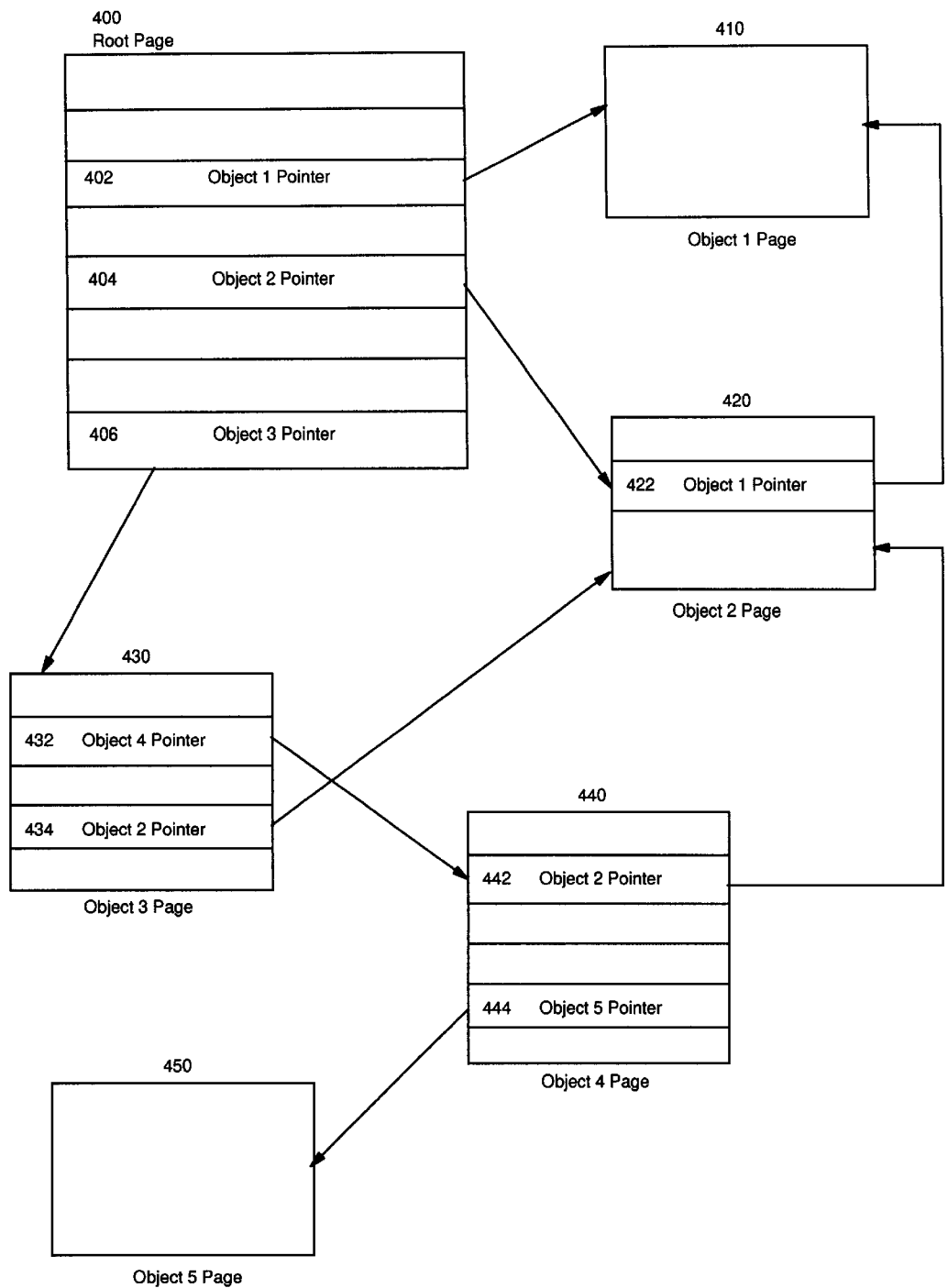
FIG. 3 is a diagram depicting the faulted page loading and initialization of the present invention.

Referring to FIG. 3, the example page layout of FIG. 2 is expanded to depict the dereferencing of a pointer and the page loading and initialization initiated by the fault handling of the dereferenced pointer. In this example, the dereferenced pointer is object 3 pointer 406. Object 3 pointer references object 3 page 430 which is an access frontier page (see above in relation to FIG. 2). Consequently, deferencing results in a fault handled by the page fault interrupt handling routine of the present invention. The page fault interrupt handling routine proceeds, for all uninitialized pages pointed to by pointers on the faulted page which in this case is only object 4 page 440, to initialize the page including bringing in that page into main memory 140 from the object server 220 and swizzling the pointers on object 4 page, namely object 2 pointer 442 and object 5 pointer 444. This page and other pages previously initialized but inaccessible pointed to by pointers on the faulted page, which in the case of the faulted object 3 page 430 is only object 2 page 420 pointed to by object 2 pointer 434 of object 3 page 430, become the access frontier pages for the faulted object 3 page 430. That is, the soon to be accessible faulted object 3 page 430 is "surrounded" by inaccessible but initialized access frontier pages except for the properly initialized and accessible root page 400. Furthermore, all pointers contained in the new access frontier page, namely object 4 page 440, that do not point to either the faulted object 3 page 430, the root page 400 or access frontier pages such as object 2 page 420 pointed to by object 2 pointer 434 have pages created for them. In this case, object 5 pointer 444 of access frontier page object 4 page 440 does not point to any of the foregoing types of pages and accordingly a page is created for that pointer. This page is made inaccessible and is not initialized. Only a page table entry would exist for this page and no backing memory is created for it. Finally, the faulted object 3 page 430 is made accessible which makes object 3 page 430 an initialized and accessible page.

The result of the above described method of the present invention is that, from the beginning of program execution [600] to the end of program execution [700], pages being initialized are always protected by a frontier of inaccessible pages so that other threads within the program process cannot (except via wild pointer, which is a programmer bug in any case) access them. Other threads would take a fault when dereferencing a pointer to an access frontier page before they could get at the pointer to the page being initialized. The step of making an access frontier page accessible only occurs after the access frontier page(s) for the newly accessible page has been properly created and when made accessible, the access frontier page has already been completely initialized. At no time is there an opportunity for a thread to legitimately get access to a page before it has been completely initialized. Moreover, the pages of each thread may be protected by the present invention meaning that separate "spurs" of access frontiers may occur in the memory space, each initializing page in each such spur protected by an access frontier.

Nested faults can be dealt with by standard mechanisms for keeping instances of the page fault interrupt handling routine of the present invention from interfering with each other in a multi-threaded system. A nested fault occurs when, during the handling of a fault by a thread, another thread attempts to deference a pointer to an inaccessible page. Standard mechanisms such as appropriate locking and synchronization routines can be used to allow for correct operation of multiple instances of the page fault interrupt handling routine of the present invention in the presence of multiple faults arising concurrently on multiple threads. In the preferred embodiment, a serializing page fault interrupt handling routine first checks that the faulted page is still inaccessible before starting initialization of the page. If it is no longer inaccessible, that means another page fault interrupt handling routine is initializing or has initialized that page during the period between when a fault was detected for that first page fault interrupt handling routine and when the first page fault interrupt handling routine became active and attempted to lock onto the page. Accordingly, when the page is accessible, the page fault interrupt handling routine does not have to initialize the page as it is already being or has been done. The deference would be simply allowed to proceed.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

In the case of flow diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

The invention is preferably implemented in a high level procedural or object-oriented programming language to communicate with a computer. However, the invention can be implemented in assembly or machine language, if desired. In any case, the language may be a compiled or interpreted language.

The invention may be implemented as an article of manufacture comprising a computer usable medium having computer readable program code means therein for executing the method steps of the invention or an article of manufacture comprising a computer usable medium having computer readable program code means therein, the computer readable program code means in said computer program product comprising computer readable code means for causing a computer to execute the steps of the invention. Such an article of manufacture may include, but is not limited to, CD-ROMs, diskettes, tapes, hard drives, and computer RAM or ROM. Indeed, the article of manufacture may be any solid or fluid transmission medium, magnetic or optical, or the like, for storing signals readable by a machine for controlling the operation of a general of special purpose programmable computer according to the method of the invention. Also, the invention may be implemented in a computer system. A computer system may comprise a computer that includes a processor and a memory device and optionally, a storage device, an output device such as a video display and/or an input device such as a keyboard or computer mouse. Moreover, a computer system may comprise an interconnected network of computers. Computers may equally be in stand-alone form (such as the traditional desktop personal computer) or integrated into another apparatus (such a cellular telephone).

While this invention has been described in relation to preferred embodiments, it will be understood by those skilled in the art that changes in the details of processes and structures may be made without departing from the spirit and scope of this invention. Many modifications and variations are possible in light of the above teaching. Thus, it should be understood that the above described embodiments have been provided by way of example rather than as a limitation and that the specification and drawing are, accordingly, to be regarded in an illustrative rather than a restrictive sense.

What is claimed is:

1. A method for loading pages from a persistent object system comprising the steps of:

a) for each pointer in a page initializing a corresponding page;
b) for each corresponding page pointer not pointing to an initialized page, creating a page table entry for the corresponding page pointer and marking the page pointed to by the corresponding page pointer as inaccessible;
c) marking the corresponding page as inaccessible;
d) on dereferencing a pointer in the page that causes a fault, for each pointer not pointing to an initialized page in the page pointed to by the dereferencing pointer, initializing a corresponding page;
e) for each corresponding page pointer not pointing to an initialized page, creating a page table entry for the corresponding page pointer and marking the page pointed by the corresponding page pointer as inaccessible;
f) marking the page pointed to by the dereferencing pointer as accessible; and
g) managing two or more dereferencing operations arising concurrently on two or more threads through a lock and synchronization mechanism.

2. The method of claim 1, wherein the step of initializing comprises bringing in the corresponding page from the persistent object system and if the corresponding page contains one or more pointers, swizzling one or more pointers in the corresponding page.

3. The method of claim 1, wherein the page is a root page of a program brought in from the persistent object system before execution of the program.

4. The method of claim 1, wherein the step of creating a page table entry further comprises initializing the page pointed to by the corresponding page pointer.

5. An article of manufacture comprising a computer usable medium having computer readable program code means therein for loading pages from a persistent object system, the computer readable program code means in said computer program product comprising:

computer readable code means for causing a computer to, for each pointer in a page, initialize a corresponding page;

computer readable code means for causing a computer to, for each corresponding page pointer not pointing to an initialized page, create a page table entry for the corresponding page pointer and marking the page pointed to by the corresponding page pointer as inaccessible;

computer readable code means for causing a computer to mark the corresponding page as inaccessible;

computer readable code means for causing a computer to, on dereferencing a pointer in the page that causes a fault and for each pointer not pointing to an initialized page in the page pointed to by the dereferencing pointer, initialize a corresponding page;

computer readable code means for causing a computer to, for each corresponding page pointer not pointing to an initialized page, create a page table entry for the corresponding page pointer and marking the page pointed by the corresponding page pointer as inaccessible;

computer readable code means for causing a computer to mark the page pointed to by the dereferencing pointer as accessible; and computer readable code means for causing a computer to manage two or more dereferencing operations arising concurrently on two or more threads through a lock and synchronization mechanism.

6. The article of manufacture of claim 5, wherein the computer readable code means for causing a computer to initialize a corresponding page comprises computer readable code means for causing a computer ad bring in the corresponding page from the persistent object system and if the corresponding page contains one or more pointers, swizzle one or more pointers in the corresponding page.

7. The article of manufacture of claim 5, wherein the page is a root page of a program brought in from the persistent object system before execution of the program.

8. The article of manufacture of claim 5, wherein the computer readable code means for causing a computer to create a page table entry further comprises computer readable code means for causing a computer to initialize the page pointed to by the corresponding page pointer.

* * * * *